(12) United States Patent
Kubo et al.

(10) Patent No.: US 7,247,362 B2
(45) Date of Patent: Jul. 24, 2007

(54) WEATHER STRIP (75) Inventors: Yoshihisa Kubo, Aichi (JP); Masahiko Ito, Aichi (JP); Mitsunobu Teramoto, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 141 days.

(21) Appl. No.: 10/808,591

(22) Filed: Mar. 25, 2004

(65) Prior Publication Data
US 2004/0250474 A1 Dec. 16, 2004

(30) Foreign Application Priority Data
Mar. 28, 2003 (JP) .......................... P2003-089783

(51) Int. Cl.
*E06B 7/16* (2006.01)
(52) U.S. Cl. .................... 428/136; 428/34.1; 49/475.1; 49/479.1
(58) Field of Classification Search ............... 428/34.1, 428/36.92, 122, 192, 908.8, 131, 136; 49/490.1, 49/498.1, 475.1, 479.1
See application file for complete search history.

(56) References Cited
U.S. PATENT DOCUMENTS 5,711,907 A 1/1998 Nozaki et al. .............. 264/138
5,918,421 A 7/1999 Nozaki ...................... 49/492.1
6,395,355 B1 * 5/2002 Nakajima et al. ........... 428/34.1

FOREIGN PATENT DOCUMENTS

| JP | A-S62-19454 | 2/1987 |
| JP | UM-A-62-038746 | 3/1987 |
| JP | A-H02-03952 | 1/1990 |
| JP | A-H03-43050 | 4/1991 |

* cited by examiner

Primary Examiner—Alicia Chevalier
(74) Attorney, Agent, or Firm—Posz Law Group, PLC (57) ABSTRACT When a molded portion of a weather strip is molded, a slit, from which a core body is taken out, is formed in a mounting base portion thereof. Also, plural blocking clips are provided at predetermined intervals along the slit. The blocking clips comprises a base portion, which constitutes a part of the mounting base portion, a fitting portion fitted into the slit, a lock portion locked on an inner surface of the mounting base portion, and an engaging projection formed in such a way as to project from the base portion. A fitting groove, into which the engaging projection is fitted, is formed in the mounting base portion. After a core body is taken out of a molded portion precursor, the blocking clip is attached thereto, so that the molded portion is obtained.

9 Claims, 6 Drawing Sheets

WEATHER STRIP

This specification is based on Japanese Patent Application No. 2003-089783, which is incorporated herein by reference.

BACKGROUND OF THE INVENTION

1. Field of the Invention

The present invention relates to a weather strip having a molded portion.

2. Description of the Related Art

Hitherto, a weather strip is attached to an opening portion or along a door peripheral edge of a vehicle, such as an automobile. When this kind of a weather strip is manufactured, an extrusion portion is formed like an elongated one by a publicly known extrusion molding method. Then, in a state in which an end part of the extrusion portion is set in a mold apparatus for molding a molded portion, the molded portion is continuously and connectedly molded to an end surface of the extrusion portion.

The mold apparatus used for connectedly molding the molded portion comprises a stationary mold, plural movable molds and a core mold. The core mold comprises a core body for forming a hollow portion, and also comprises an extending plate extending from the core body. When the molded portion is molded, first, an end portion of the extrusion portion having already been molded by a publicly known extrusion molding method is set in the core body by being fitted thereinto. Thus the extrusion portion is attached to the mold apparatus. Subsequently, each of the molds is disposed at a predetermined place and clamped. At this moment, a cavity for molding a molded portion is formed by using each of the molds. Then, unvulcanized rubber is injected and filled into the cavity through a gate (not shown) Subsequently, unvulcanized rubber is vulcanized. Then, each of the molds is opened. A product obtained by integrating the core mold with the vulcanized rubber (or molded portion precursor) is taken out therefrom. At that time, a slit is formed in the molded precursor owing to the presence of the extending plate.

Thus, the molded portion precursor having a hollow portion is obtained by taking the core body from the slit. Thereafter, opposite opening faces of the slit are bonded by adhesive at plural places. Thus, the molded portion is obtained. That is, a weather strip, in which this molded portion is integral with the extrusion portion, is obtained.

However, hitherto, anticipated design has been performed so that the molded portion precursor is molded to be wider than the extrusion portion by width of the slit so as to bond the opening faces of the slit. An operation of bonding the opening faces indispensably needs a step of compressing and holding the molded portion precursor in the direction of width thereof for a predetermined time in a state in which the adhesive is applied thereon. This results in a fear of increase in the number of working manhours, increase in the production cost, and reduction in productivity. Additionally, when the opening faces of the slit are bonded directly to each other, width of a mounting base portion is liable to be uneven. Consequently, there has been a fear of drawbacks, such as reduction in sealability of the molded portion.

In recent years, there has appeared a weather strip having a blocking member, instead of bonding the opening faces directly to each other, so as to counteract the drawbacks (see, for example, JP-UM-A-43050).

However, in the weather strip described in JP-UM-A-3-43050, mounting base portions thereof are simply and respectively inserted from both sides of a blocking member having a substantially H-shaped cross section. Thus, even when the mounting base portions would be bonded thereto by adhesive, there has been a fear that the mounting base portions outwardly slip off in the direction of width of the blocking member in a stage before the weather strip is attached to an opening portion or a circumferential edge of a door of a vehicle. Although it is considered that the width of the blocking member is narrowed in a part, into which the mounting base portions are fitted, so as to prevent the mounting portions from slipping off, there has been a fear that an operation of fitting the mounting base portions becomes relatively time-consuming, with the result of reduction in workability, thus, in productivity of the weather strip.

SUMMARY OF THE INVENTION

An object of the invention is to provide a weather strip having a molded portion, which can suppress increase in the number of working manhours, increase in the cost, and reduction in productivity when manufactured.

According to an aspect of the invention, there is provided a weather strip (hereunder referred to as a first aspect of the invention) comprising an extrusion portion, and a molded portion connected to the extrusion portion, a mounting base portion attachable to an opening portion or a door circumferential edge of a vehicle, and also having a seal portion that is integrally formed with the mounting base portion and has a hollow portion, a slit for taking out a core mold being formed in the mounting base portion of the molded portions when performing molding. This weather strip comprises at least one blocking member, which has an insertion portion to be fitted into the slit, and an engaging projection respectively engaged with the mounting base portion opposed to each other across the slit, for blocking a predetermined zone of the slit by simultaneously clamping and locking the mounting base portion at least in a direction of width thereof.

According to the first aspect of the invention, the blocking member for blocking a predetermined zone of the slit by simultaneously clamping and locking the mounting base portion of the molded portion at least in the direction of width is attached thereto. Therefore, the predetermined zone of the slit can be blocked without directly bonding the opening faces of the slit by adhesive. Also, the invention can suppress occurrence of the drawback that the mounting base portion slips off outwardly in the direction of width of the blocking member. Consequently, the invention can omit the step of performing anticipated design so that the molded portion precursor is molded to be wider than the extrusion portion by width of the slit, similarly to the related art, and the step of compressing and holding the molded portion precursor in the direction of width thereof for a predetermined time in a state, in which the adhesive is applied thereon, similarly to the related art. Thus, the invention can suppress increase in the number of working manhours, increase in production cost, and reduction in productivity. Also, the invention can suppress occurrence of the drawback that the direct bonding of the opening faces of the slit results in uneven width of the mounting base portion and in degradation in the increase in the number of working manhours, increase in the production cost, and reduction in productivity sealability of the molded portion. Moreover, the invention can reduce the possibility of occurrence of a drawback that it takes time and labor to attach the blocking members to the weather strip, because there is no necessity for performing anticipated design so that the width of the blocking member in a part, into which the mounting base portion is fitted, is preliminarily set to be narrow so as to prevent the mounting base portion from slipping off, similarly to the case of employing the related art block member. Incidentally, the number of the blocking members and the width in the longitudinal direction of the slit appropriately changes corresponding to the shape of the molded portion according to design. For example, in a case where the curvature of the molded portion, such a substantially linear molded portion, is small, it is considered that one blocking member is provided corresponding to the entire zone, in which the slit is formed. Conversely, in a case where the curvature of the molded portion is large, it is considered that plural blocking members, whose width corresponding to the longitudinal direction of the slit is relatively narrow, are provided therein.

In an embodiment (hereunder referred to as a second aspect of the invention) of the first aspect of the invention, each of the engaging projections is formed in such a way as to project in parallel with the fitting portion. Also, a fitting groove, into which an associated one of the engaging projections is fitted, is formed in each of the mounting base portions.

According to the second aspect of the invention, the engaging projection is fitted into the fitting groove, so that a more stable engaged state of the engaging projection and the mounting base portion can be assured. Moreover, the mounting base portion can be more reliably clamped and locked. Additionally, the blocking member can be reliably positioned at a predetermined place.

In an embodiment (hereunder referred to as a third aspect of the invention) of the first or second aspect of the invention, the blocking member has a pair of sandwich-holding portions, each of which is integrally formed with an associated one of both end parts of the fitting portion, for sandwich-holding the mounting base portion. Also, the engaging projection is integrally formed with at least one of the pair of sandwich-holding portions.

According to the third aspect of the invention, the blocking member becomes difficult to slip off the slit. Thus, the engaged state of the blocking member can be stabilized still more.

In an embodiment (hereunder referred to as a fourth aspect of the invention) of the third aspect of the invention, the engaging projection is formed in the sandwich-holding portion corresponding to a mounting face side of each of the mounting base portions.

The fourth aspect of the invention facilitates an operation of engaging the engaging projection with the mounting base portion. Also, in a case that the fitting groove corresponding to the engaging projection is formed in the mounting base portion, the fourth aspect facilitates an operation of molding the fitting groove during the molding of the molded portion.

In an embodiment (hereunder referred to as a fifth aspect of the invention) of the first or second aspect of the invention, the blocking member has a base portion, which constitutes a part of the mounting base portion at a mounting face side of the mounting base portion, and also has a lock portion locked on an inner surface of the mounting base portion facing the hollow portion. The engaging projection is integrally formed with the base portion.

According to the fifth aspect of the invention, the blocking member becomes difficult to slip off the slit. Consequently, the engaged state of the blocking member can be stabilized still more.

In an embodiment (hereunder referred to as a sixth aspect of the invention) of the fifth aspect of the invention, the blocking member is attached thereto so that the base portion is substantially flush with a mounting face of the mounting base portion.

The sixth aspect of the invention can prevent degradation in attach ability when the weather strip is attached to the opening portion of a vehicle or to a door circumferential edge.

In an embodiment (hereunder referred to as a seventh aspect of the invention) of the fifth or sixth aspect of the invention, a tapered surface is formed on the lock portion at an end side of the blocking member.

The seventh aspect of the invention facilitates the insertion of the fitting portion and the lock portion into the slit. Consequently, workability can be enhanced.

In an embodiment (hereunder referred to as an eighth aspect of the invention) of one of the first to seventh aspects of the invention, the fitting portion is formed so that thickness of the fitting portion is wider than width of the slit. Moreover, a concave portion, whose depth depends on the thickness of the fitting portion, is formed in each of opposed opening face portions of the slit at a place at which the fitting portions is fitted into the slit.

According to the eighth aspect of the invention, the blocking member can be more reliably positioned at a predetermined place. Also, the mounting base portion can be more reliably prevented from deforming in the direction of width of the mounting base portion.

In an embodiment (hereunder referred to as a ninth aspect of the invention) of one of the first to eighth aspects of the invention, the engaging projections are integrally formed with each other circularly in such a way as to straddle over both the mounting base portions facing each other across the slit.

According to the ninth aspect of the invention, the engaging projections are integrally formed like a ring with each other. Thus, the blocking member (that is, the engaging projection) is suppressed from deforming in the direction of width of the mounting base portion. Consequently, the force for clamping and locking the mounting base portion, which is exerted by the blocking member, can be enhanced.

In an embodiment (hereunder referred to as a tenth aspect of the invention) of one of the first to ninth aspects of the invention, a plurality of the blocking members molded into a substantially same shape in such a way as to have a size corresponding to one of all zones set in the slit are attached to the weather strip.

According to the tenth aspect of the invention, the plural blocking members have a size corresponding to one of all the zones of the slit and are molded into a substantially same shape. When the blocking member has a shape that is continuous corresponding to the longitudinal direction of a predetermined slit, the blocking member should be bent along the longitudinal direction of the slit during an operation of attaching the blocking member in a case that the curvature of the molded portion is relatively large. Thus, there is a fear of reduction in the working efficiency. Additionally, the size and shape of the blocking member should be changed due to the difference in shape between the molded portions. Thus, the versatility of the blocking members is degraded. Consequently, there is a fear that the production cost thereof may increase. In view of this respect, adoption of the aforementioned configuration and use of the plural blocking members having a substantially same shape result in that a molded portion having relatively large curvature is available. Moreover, various kinds of the molded portions differing in shape from one another are available. Consequently, versatility of the blocking members is enhanced. Additionally, the size of each of the blocking members can be reduced by using plural blocking members. Consequently, the blocking members can be easily used. Thus, working efficiency can be enhanced.

In an embodiment (hereunder referred to as an eleventh aspect of the invention) of one of the first to tenth aspects of the invention, the blocking member is bonded and fixed to the mounting base portion.

The eleventh aspect of the invention more surely prevents occurrence of the drawback in that the blocking members slip off. Thus, a more stable engaged state of the blocking member and the mounting base portion can be assured. Incidentally, when the bonding and fixing of the blocking member are performed, the mounting state is maintained in a condition in which the blocking member is positioned at a predetermined place by using various kinds of aspects. Thus, there is no need for holding the weather strip until the adhesive dries. Consequently, productivity can be enhanced.

BRIEF DESCRIPTION OF DRAWINGS

FIGS. 11A and 11B are perspective views illustrating another embodiment of the blocking clip.

DETAILED DESCRIPTION OF PREFERRED EMBODIMENTS

Figure 1:
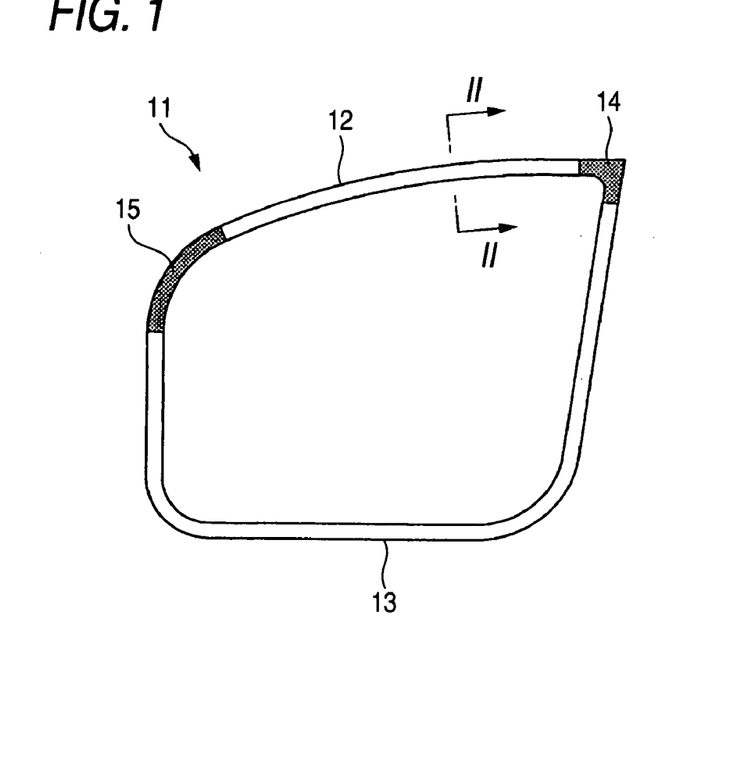
FIG. 1 is a schematic view illustrating an outline configuration of a weather strip that is an embodiment of the invention.

Hereinafter, an embodiment of the invention is described with reference to the accompanying drawings. FIG. 1 shows a door weather strip (hereunder referred to simply as a "weather strip") 11 made of EPTM (ethylene-propylene-diene copolymer) is attached along an outer circumference of an automotive door.

The weather strip 11 has extrusion portions 12, 13 and molded portions (indicated by scattered-dot patterns in this figure) 14, 15. That is, the extrusion portions 12, 13 are almost linearly (or elongatedly) formed by an extruder (not shown). The molded portions 14, 15 are formed by a predetermined mold apparatus in such a way as to connect end edges of the adjacent extrusion portions 12, 13.

Figure 2:
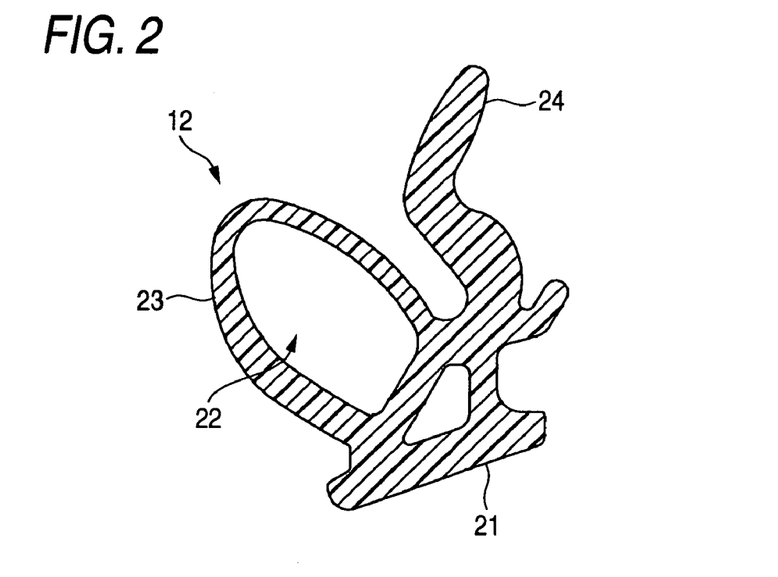
FIG. 2 is a sectional view, taken on line II-II in FIG. 1, illustrating an extrusion portion.
Figure 3:
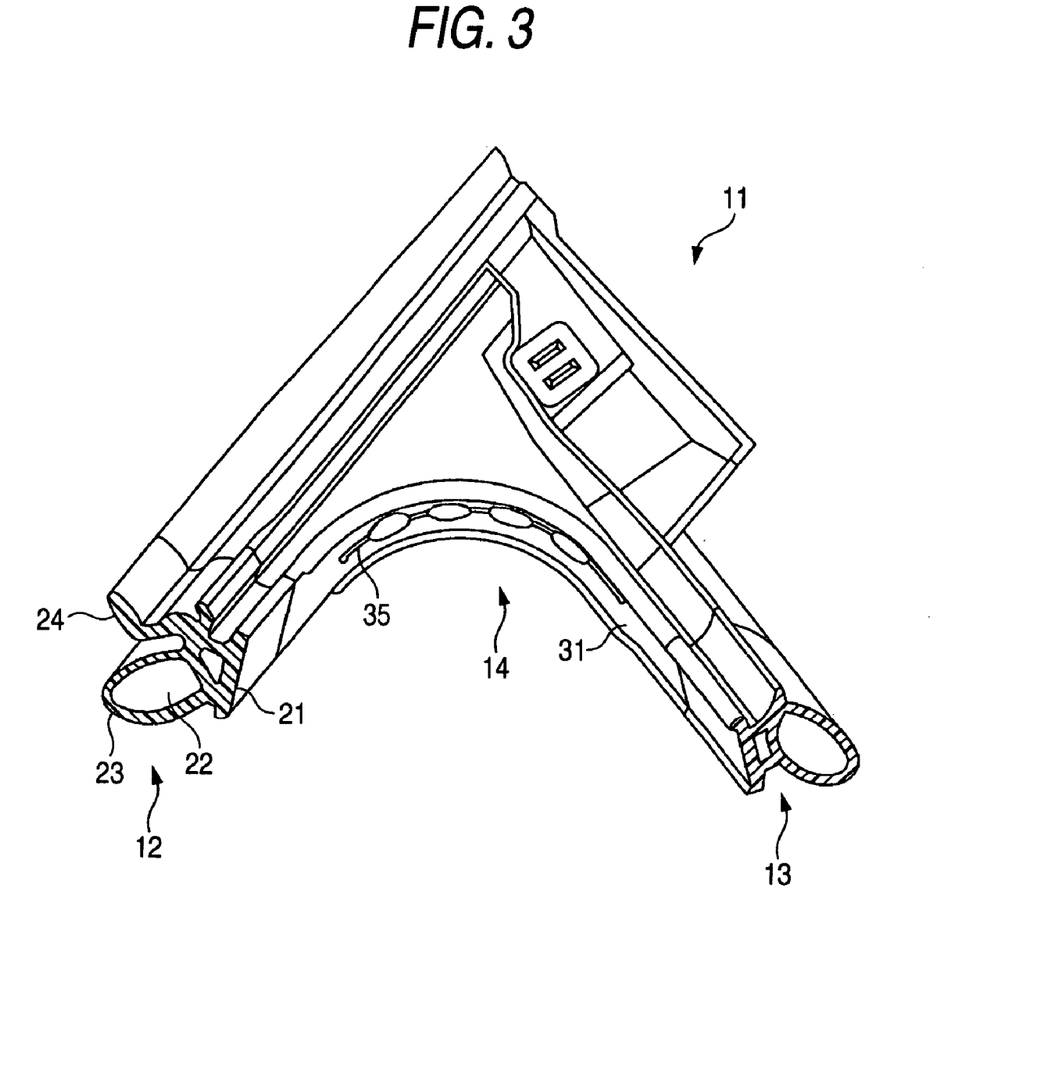
FIG. 3 is a view illustrating a molded portion that corresponds to an upper corner portion.

FIG. 2 shows each of the extrusion portions 12 (13) has a mounting base portion 21 attached to a door sash (not shown) of an automobile door, and also has a seal portion 23, which extends from the mounting base portion 21 and has a hollow portion 34 formed therein, and a lip portion 24 extending from a base end portion of the seal portion 23.

FIGS. 3 to 7 show the molded portion 14 corresponding to the upper corner portion has a mounting base portion 31, a seal portion 32, a lip portion 33, and a hollow portion 34, similarly to the extrusion portions 12, 13, though the molded portion 14 differs in shape from each of the extrusion portions 12, 13. Although not shown, another molded portion 15 has constituent elements similar to those of the molded portion 14, which are described hereinbelow, though the molded portions 14 and 15 differ in shape from each other.

Figure 4:
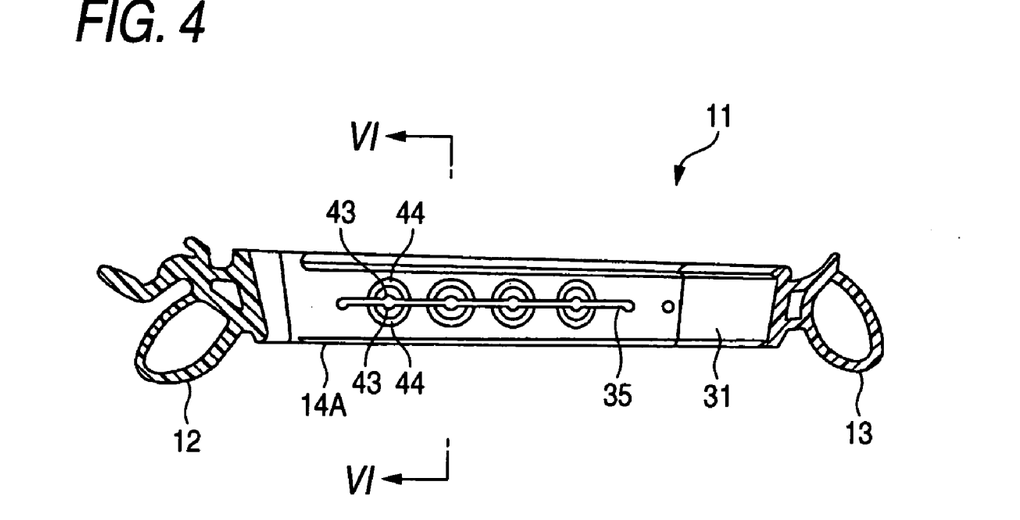
FIG. 4 is a view, taken from the side of a mounting face of the weather strip, illustrating a molded portion precursor.
Figure 5:
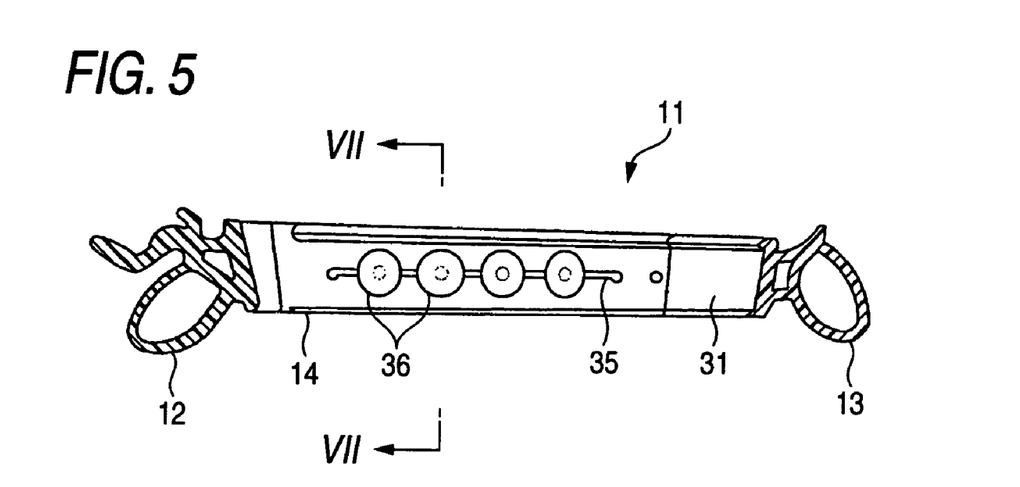
FIG. 5 is a view, taken from the side of the mounting face of the weather strip, illustrating the molded portion.
Figure 6:
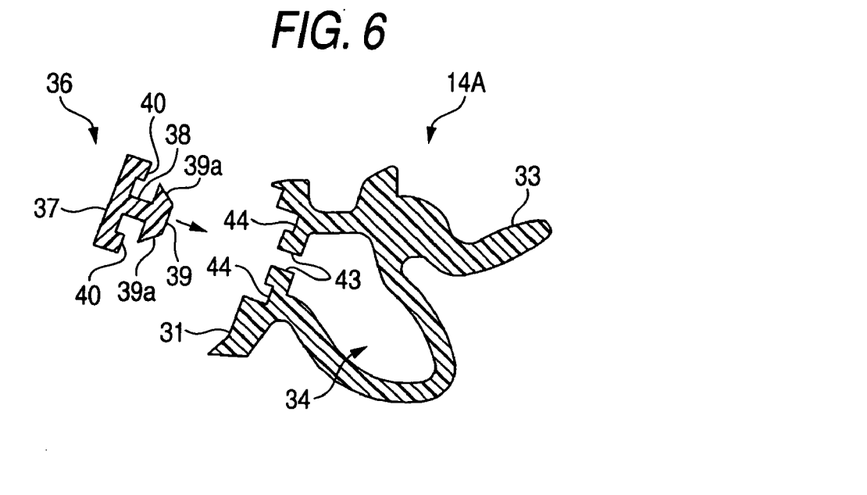
FIG. 6 is a sectional view, taken on line VI-VI in FIG. 4, illustrating the molded portion precursor.

A slit 35 is formed in the mounting base portion 31 of the molded portion 14 along the longitudinal direction thereof by takeout of the mold, as will be described later. Also, plural blocking clips 36 serving as blocking members are fitted into the slit 35 at predetermined intervals in the molded portion 14 along the longitudinal direction thereof (see FIGS. 5 and 7). The plural blocking clips 36 each having a size corresponding to one of all zones of the slit 35 are molded into a substantially same shape. Incidentally, FIGS. 4 and 6 show a molded portion precursor 14A (to be described later) provided before completion of molding of the molded portion 14, that is, before the blocking clips 36 are fitted into the slit 35.

More particularly, FIGS. 6 to 8B show each of the blocking clips 36 comprises a substantially disk-shaped base portion 37, which constitutes a part of the mounting base portion 31 at the side of the mounting face of the mounting base portion 31 when attached thereto, a substantially cylindrical fitting portion 38 integrally formed with the base portion 37 and fitted into the slit 35, a lock portion 39 locked on an inner surface of the mounting base portion 31, which faces a hollow portion 34, and an engaging projection 40 formed in such a way as to project from a circumferential edge of the base portion 37 in parallel with the fitting portion 38. Incidentally, the engaging projection 40 is formed circularly along the circumferential edge of the base portion 37. Paired sandwich-holding portions according to this embodiment are constituted by the base portion 37 and the lock portion 39.

Each of the fitting portions 38 is formed so that a thickness thereof is wider than a width of the slit 35. A concave portion 43, whose depth depends on the thickness of an associated one of the fitting portions 38, is formed in each of opposed opening face portions of the slit 35 at a place at which the associated one of the fitting portions 38 is fitted into the slit 35. Also, a fitting groove 44, into which each of the engaging projections 40 is fitted, is formed at the side of the mounting face of the mounting base portion 31 in such a manner as to surround an associated one of the concave portions 43.

Figure 8A:
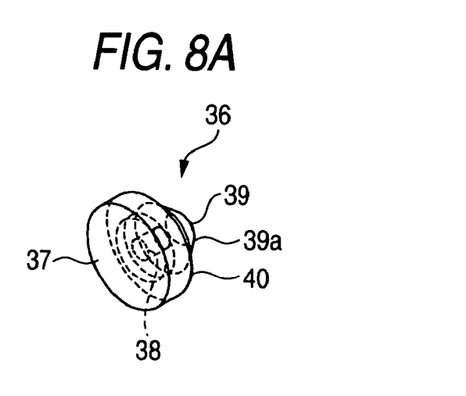
FIGS. 8A and 8B are perspective views illustrating a blocking clip.
Figure 8B:
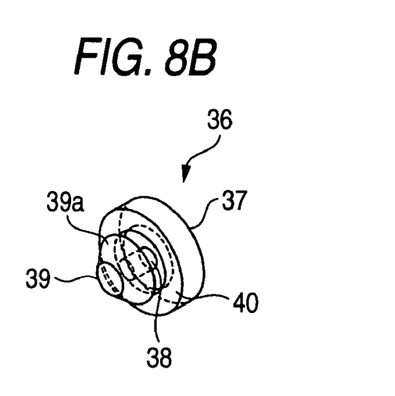

Incidentally, tapered face 39a is formed on the sides of end parts of the lock portion 39 of each of the blocking clips 36 so as to facilitate insertion of the insertion portion 38 and the lock portion 39 into the slit 35. Moreover, when the insertion portion 38 is fitted into the slit 35, a surface of the base piece portion 37 is almost flush with the mounting face of the mounting base portion 31, so that the base piece portion 37 constitutes a part of the mounting base portion 31.

Figure 9:
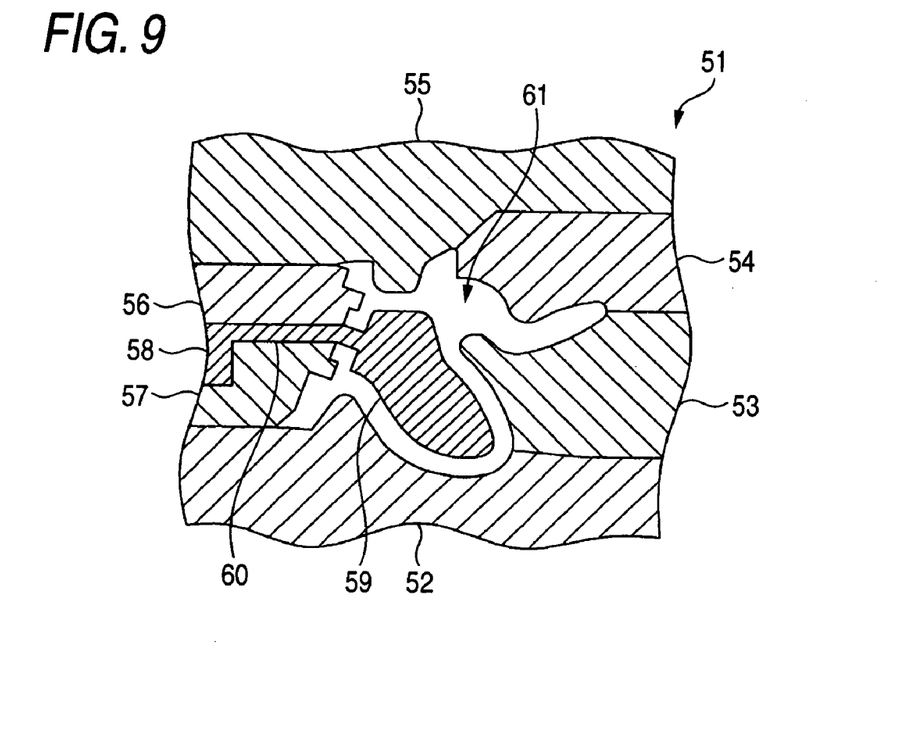
FIG. 9 is a sectional view illustrating a mold apparatus for molding the molded portion.

Next, a mold apparatus 51 for molding the molded portion 14, which corresponds to the upper corner portion, of the weather strip 11 is described hereinbelow. FIG. 9 is a sectional view illustrating the mold apparatus 51 used for molding the molded portion 14. The mold apparatus 51 has, for example, a stationary mold 52 shown in a lower part of this figure, and plural movable molds (a first movable mold 53, a second movable mold 54, a third movable mold 55, a fourth mold 56, and a fifth mold 57). A core mold 58 is provided between the fourth movable mold 56 and the fifth movable mold 57. The first to fifth movable molds 53 to 57 are provided in such a way as to be enabled by a cylinder or the like (not shown) to perform relative movement with respect to the stationary mold 52. The core mold 58 comprises a core body 59 and an extending plate 60 integrally extends from the core body 59.

A molding face corresponding to the outer shape of the molded portion 14 (other than the blocking clip 36) is formed on each of the stationary mold 52 and the movable molds 53 to 57. The core body 59 is used for forming the hollow portion 34, and placed at the center of a space surrounded by the stationary mold 52 and the movable molds 53 to 57. A cavity 61 for molding the molded portion 14 is formed by these molding faces and the outer surface of the core body 59. Incidentally, molding faces corresponding to the concave portion 43 and the fitting groove 44 are formed at a predetermined place, to which the blocking clip 36 is attached, by the movable molds 56 and 57 and the extending plate 60.

Next, a manufacturing method for the weather strip 11 having the aforementioned configuration, and operations of and advantages in manufacturing the weather strip 11 are described hereinbelow. First, the extrusion portions 12 and 13 are molded according to a publicly known extrusion molding method by using an extruder (not shown). As a result of this molding, the mounting base portion 21, the seal portion 23, a hollow portion 22, and the lip portion 24 of each of the extrusion portions 12 and 13 are formed.

Subsequently, the molded portion 14 is molded as follows. That is, first, in a state in which the molds 52 to 57 are mold-opened to one another, end parts of the extrusion portions 12 and 13 are set by being fitted to both end portions in the longitudinal direction of the core body 59 of the core mold 58. The movable molds 53 to 57 and the core mold 58 are set at predetermined places on the stationary mold 52 and then mold-clamped. Thus, the extrusion potions 12 and 13 are attached and fixed to the mold apparatus 51. Also, as shown in FIG. 9, the cavity 61 is formed.

Figure 10:
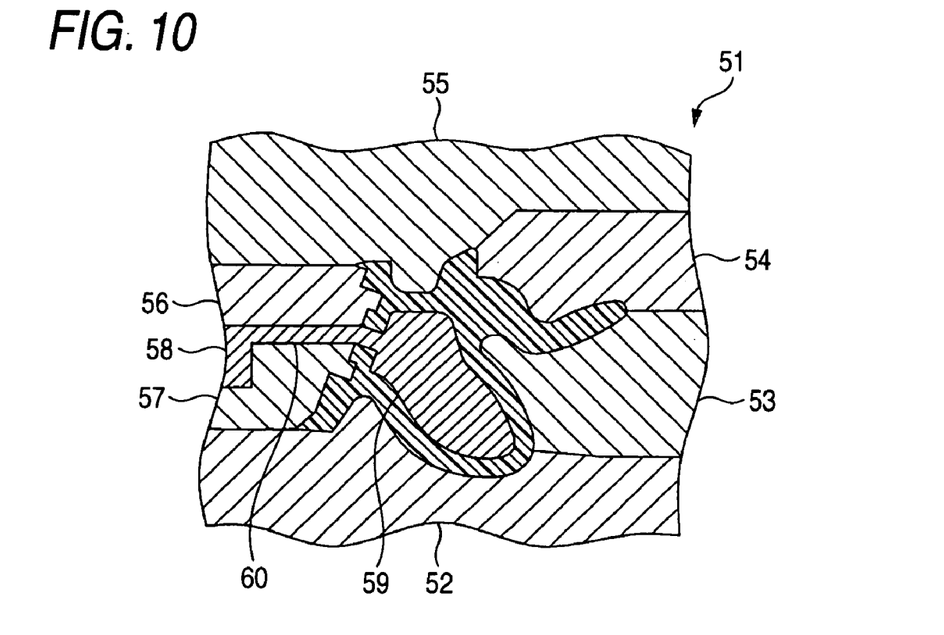
FIG. 10 is a sectional view illustrating the mold apparatus in a state in which a rubber material is filled in a cavity.

During this state, plasticized EPDM is injected from a gate (not shown) into and filled in the cavity 61, as shown in FIG. 10. Subsequently, the EPDM is vulcanized and solidified. Upon completion of solidification thereof, the movable molds 53 to 57 are serially mold-opened. Then, the molded rubber member (hereunder referred to as a "molded portion precursor") 14A is taken out of the mold apparatus 51 together with the core mold 58.

Subsequently, in a state in which the molded portion precursor 14A is separately supported, the extending plate 60 is grasped and then drawn in such a way as to be leftwardly pulled out, as viewed in this figure. At that time, the core body 59 is taken out of the molded portion precursor 14A through the slit 35 formed therein. Then, this takeout of the core body 59 results in that the inside of the molded portion precursor 14A is in a hollow state (see FIG. 6).

Figure 7:
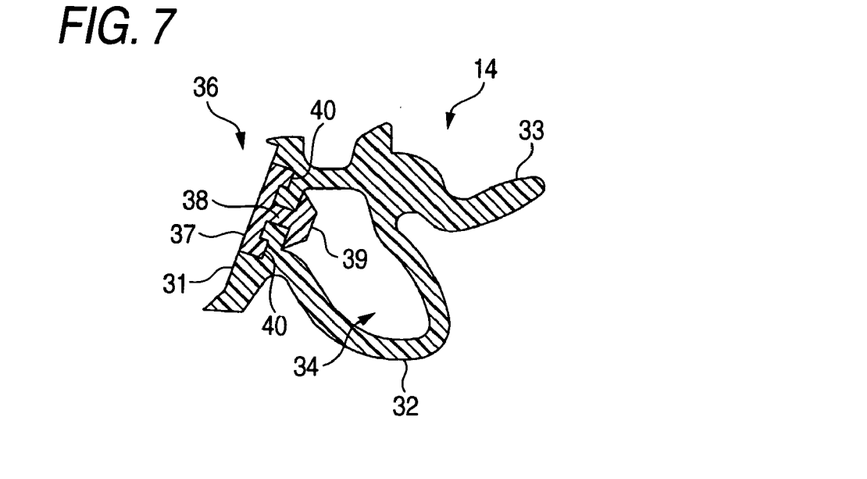
FIG. 7 is a sectional view, taken on line VII-VII in FIG. 5, illustrating the molded portion.

Subsequently, as shown in FIG. 7, the blocking clips 36 preliminarily manufactured in another process are attached to this precursor. Particularly, first, a worker holds the base portion 37 of the blocking clip 36 and warps the base portion 37 so as to outwardly turn the engaging projections 40. Then, the worker adjusts the position of the blocking clip 36 to a place at which the concave portions 43 of the slit 35 are formed. Subsequently, the worker pushes the blocking clip 36 into the slit 35 from a leading end portion thereof and fits the fitting portion 38 into the slit 35. Thus, the lock portion 39 is locked on an inner surface of the molded portion precursor 14A. Also, the engaging projection 40 is fitted into the fitting groove 44. Consequently, the molded portion 14 is finally obtained. Incidentally, although description is omitted, the other molded portion 15 is similarly formed by using a predetermined mold apparatus. Further, the molded portions 14 and 15 differ from each other in the number of the blocking clips provided therein, and in the width thereof corresponding to the longitudinal direction of the slit, because of the difference in shape therebetween. Thus, the weather strip 11 having the extrusion portions 12 and 13 and also having the formed portions 14 and 15 respectively and continuously molded to the extrusion portions 12 and 13 is obtained.

As described above, according to this embodiment, the blocking clip 36 for blocking a predetermined zone of the slit 35 by simultaneously clamping and locking the mounting base portion 31 of the molded portion 14 at least in the direction of width is attached thereto. Therefore, the predetermined zone of the slit 35 can be blocked without directly bonding the opening faces of the slit 35 by adhesive. Also, the invention can suppress occurrence of the drawback that the mounting base portion 31 slips off outwardly in the direction of width of the blocking clip. Consequently, the invention can omit the step of performing anticipated design so that the molded portion precursor is molded to be wider than the extrusion portion 14A by width of the slit 35, similarly to the related art, and the step of compressing and holding the molded portion precursor 14A in the direction of width thereof for a predetermined time in a state, in which the adhesive is applied thereon, similarly to the related art. Thus, the invention can suppress increase in the number of working manhours, increase in production cost, and reduction in productivity. Also, the invention can suppress occurrence of the drawback that the direct bonding of the opening faces of the slit 35 results in uneven width of the mounting base portion 31 and in degradation in the increase in the number of working manhours, increase in the production cost, and reduction in productivity sealability of the molded portion 14.

Also, according to this embodiment, the blocking clip 36 is formed so that the width of the fitting portion 38 is wider than the width of the slit 35. Moreover, the concave portions 43, whose depths are set according to the thickness of the fitting portion 38, are formed in opposed opening face portions of the slit 35. Consequently, the blocking clips 36 can be more reliably positioned at the predetermined places. The mounting base portion 31 can be more reliably prevented from being deformed inwardly in the direction of width thereof.

Also, the engaging projection 40 is formed like a ring along the circumferential edge of the substantially disk-shaped base portion 37. The engaging projections 40 are integrally formed with each other in such a way as to straddle over both the mounting base portions 31 facing each other across the slit 35. Consequently, the blocking clip 36 (that is, the engaging projection 40) can be suppressed from being deformed in the direction of width of the mounting base portion 31. Moreover, a clamping and locking force exerted by the blocking clip 36 on the mounting base portion 31 can be increased.

Also, a blocking member can be attached to the molded portion 14, whose curvature is relatively large, by employing the blocking clip 36. Moreover, the blocking clip 36 can be adapted to various kinds of molded portions having different shapes, for example, the molded portions 14, 15 without changing the configuration of the blocking clip 36. Thus, the versatility of the blocking members is enhanced. Furthermore, the size of the blocking clip 36 can be reduced to a relatively small value. Thus, the blocking clips 36 are easy to use. Consequently, working efficiency is enhanced.

Incidentally, the invention is not limited to the described embodiment. For example, the invention may be practiced in the following manner. Needless to say, other applications and alterations, which are not exemplified in the following description, may be made.

(a) Although the aforementioned embodiment is adapted so that the blocking clips 36 are simply fitted into the slit 35 and that the blocking clips 36 are not bonded to the mounting base portion 31, adhesive may be applied to at least a part of abutting faces of the blocking clip 36 and the mounting base portion 31 to thereby bond both the blocking clip 36 and the mounting base portion 31 so as to more reliably prevent slip-off of the blocking clip 36. Incidentally, in this case, there is no necessity for holding the molded portion 14 until the adhesive dries. Thus, the productivity can be enhanced.

Figure 11A:
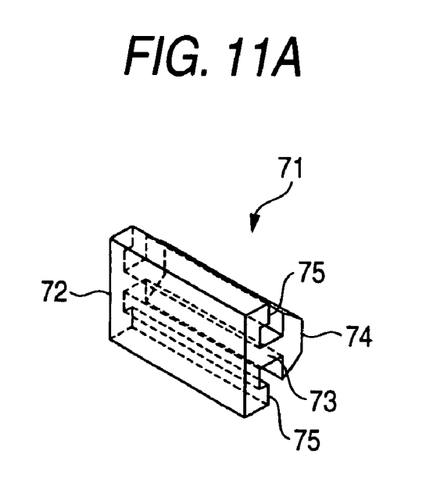

(b) The shape of the blocking clip is not limited to that of the blocking clip of the aforementioned embodiment. For example, blocking clips of configurations shown in FIGS. 11A and 11B may be employed. The blocking clip 71 comprises a substantially flat base portion 72 constituting a part of the mounting base portion of the molded portion, to which this blocking clip 71 is attached, and also comprises a substantially cylindrical fitting portion 73 integrally formed with the base portion 72 and fitted into the slit 35, a lock portion 74 locked on an inner surface of the mounting base portion, which faces a hollow portion of the molded portion, and paired engaging projections 75 formed on both end parts in the direction of width of the base portion 72 in such a way as to project in parallel with the fitting portion 73. Incidentally, needless to say, although the drawing is omitted, the molded portion precursor, to which the blocking clip 71 is attached, is molded according to the shape of the blocking clip 71 and has a fitting groove, into which the engaging projections 75 are fitted.

Figure 12:
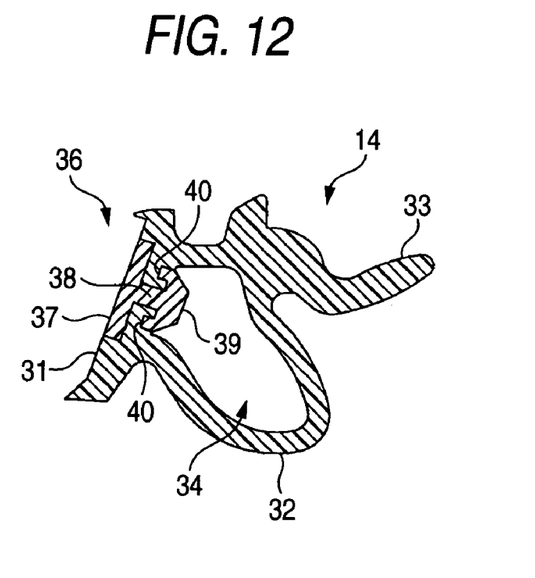
FIG. 12 is a sectional view illustrating another embodiment of the molded portion.

(c) Although the fitting groove 44, into which the engaging projections 40 are fitted, is formed at the side of the mounting face of the mounting base portion 31 in the aforementioned embodiment, the configuration of the weather strip of the invention is not limited to such a configuration. The weather strip maybe configured so that the fitting groove 44 is omitted, and that a part of the mounting base portion 31 is sandwich-held by the engaging projection 40 and the fitting portion 38 thereby to clamping and locking the mounting base portion 31 in the direction of width thereof. Needless to say, it is preferable for positioning of the blocking clip 36 that the fitting groove is provided in the mounting base portion 31. Alternatively, as shown in FIG. 12, the weather strip may be configured so that the engaging projections are provided on the lock portion 39, and that the fitting groove, in which the engaging projections are fitted, is provided in the inner surface portion of the mounting base portion 31. However, for convenience in performing an operation of molding the molded portion and an operation of attaching the blocking clips, it is more preferable that the engaging projections and the fitting groove are provided corresponding to the mounting face side of the mounting base portion 31.

(d) Although the invention is embodied as the aforementioned embodiment by being applied to the molded portion corresponding to each of the corner portions, the feature of the invention is not limited to the molded portions corresponding to the corner portions. The invention can be applied to, for instance, approximately linear molded portions to be molded by being connected to terminals of extrusion portions.

(e) In the aforementioned embodiment, the invention is embodied as a weather strip attached to a sash door. However, an embodiment of the invention is not limited thereto. The invention can be applied to a weather strip attached to what is called a press door. Needless to say, the invention can be applied to a weather strip attached to an opening portion of a door.

(f) Although EPDM is employed as a material of the weather strip 11 in the aforementioned embodiment, the weather strip may be made of one of various other kinds of rubber, such as styrene-butadiene rubber, butadiene rubber, chloroprene rubber, butyl rubber, nitrile rubber, ethylene-propylene copolymerized rubber and acrylic rubber, or a synthetic resin material having rubber-like elasticity (in this case, it is assumed that such a synthetic resin material belongs to the category of a rubber material).

What is claimed is:

1. A weather strip having an extrusion portion, and a molded portion connected to the extrusion portion, the weather strip comprising:

a mounting base portion attachable to an opening portion or a door circumferential edge of a vehicle;

a seal portion that is integrally formed with the mounting base portion and has a hollow portion;

a slit through which a core mold is removed in a molding process of the weather strip, wherein the slit is formed in the mounting base portion, wherein the slit divides the mounting base portion into a first engaged portion and a second engaged portion, and wherein the first engaged portion and the second engaged portion are opposed to one another across the slit; and at least one blocking member, which is a separate and independent part from the mounting base portion, wherein the blocking member comprises:

a base portion;

an insertion portion, which projects from the base portion and which is to be fitted into the slit;

at least one engaging projection, which projects from the base portion and which is to be engaged with at least one of the first engaged portion and the second engaged portion, and a lock portion, which is locked on an inner surface of the mounting base portion and which faces the hollow portion, wherein the blocking member blocks a predetermined zone of the slit by simultaneously clamping and locking the mounting base portion at least in a direction of width thereof.

2. A weather strip according to claim 1, wherein each of the first engaged portion and the second engaged portion is a fitting groove.

3. A weather strip according to claim 1, wherein the blocking member further comprises:

a pair of sandwich-holding portions constituted by the base portion on one end thereof and the lock portion on another end thereof, between which the insertion portion is located, for sandwiching the mounting base portion of the molded portion.

4. A weather strip according to claim 1, wherein the blocking member has the base portion, which constitutes a part of the mounting base portion of the molded portion at a mounting face side of the mounting base portion when the blocking member is attached to the molded portion of the weather strip, and wherein an outer surface of the base portion of the blocking member is substantially flush with a mounting face of the mounting base portion.

5. A weather strip according to claim 4, wherein:

a tapered surface is formed on the lock portion at an end side of the blocking member.

6. A weather strip according to claim 1, wherein:

the insertion portion of the block member is formed so that thickness of the insertion portion is greater than width of the slit, which extends in a longitudinal direction of the weather strip;

a pair of first and second engaged portions is formed in the molded portion of the weather strip at a place at which the insertion portion is fitted into the slit, such that a gap between the first and second engaged portions corresponds to the thickness of the insertion portion.

7. A weather strip according to claim 1, wherein the block member is one of a plurality of identical block members arranged in a longitudinal direction of the weather strip, each of which has the engaging projection, and wherein the first and second engaged portions are fitting grooves, and the engaging projection is ring-like and engages the fitting grooves while straddling the slit.

8. The weather strip according to claim 2, wherein each fitting groove has a semi-circular circular arc shape such that the fitting grooves together form a circular shape, and the engaging projection engages the semi-circular fitting grooves.

9. The weather strip according to claim 2, wherein the at least one engaging projection includes a pair of parallel engaging projections, each fitting groove has a linear shape and is parallel to the slit, each of the engaging projections is linear and is parallel to the slit, and the engaging projections engage the fitting grooves, respectively.

\* \* \* \* \*